Patented Mar. 23, 1926.

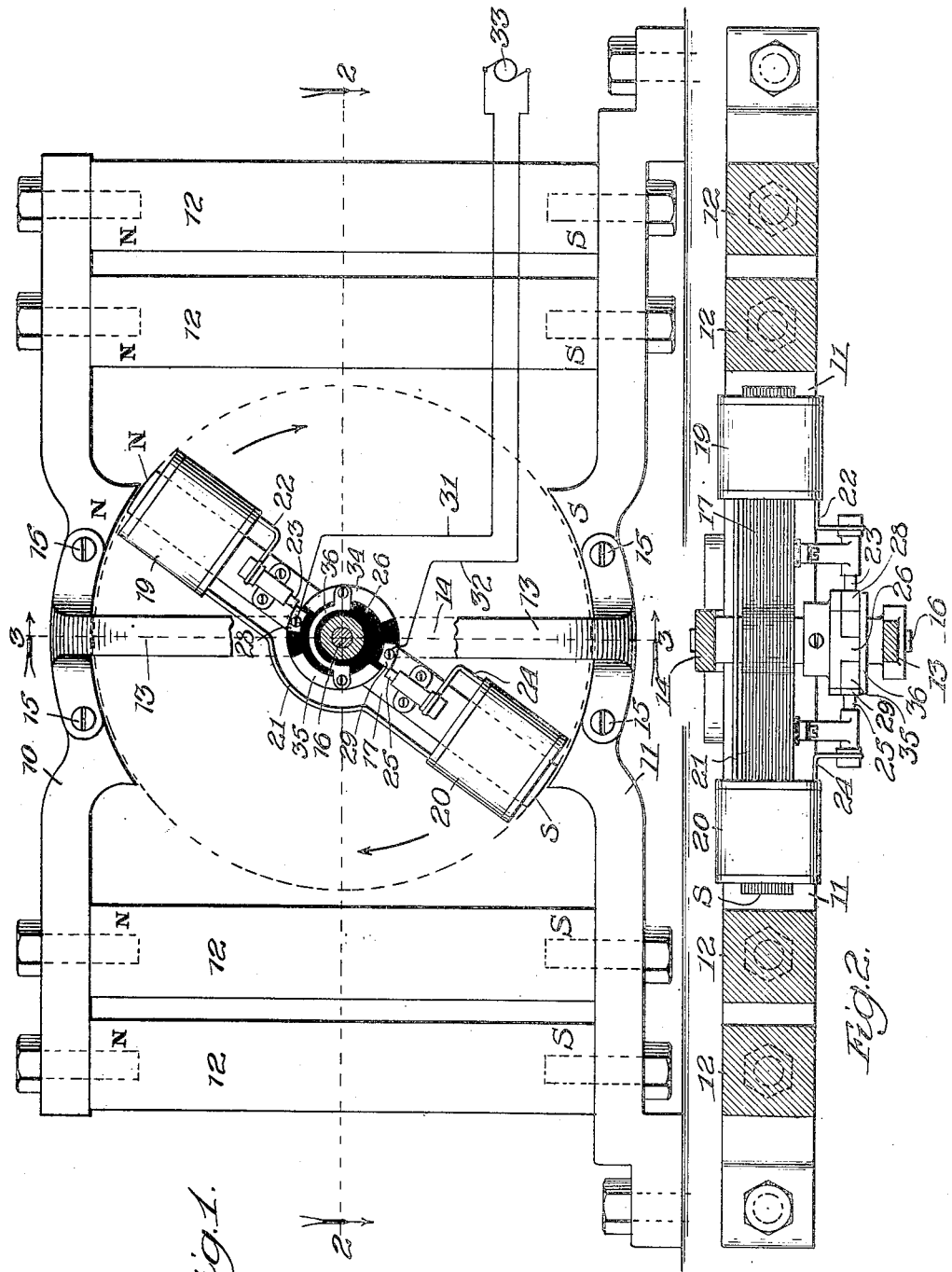

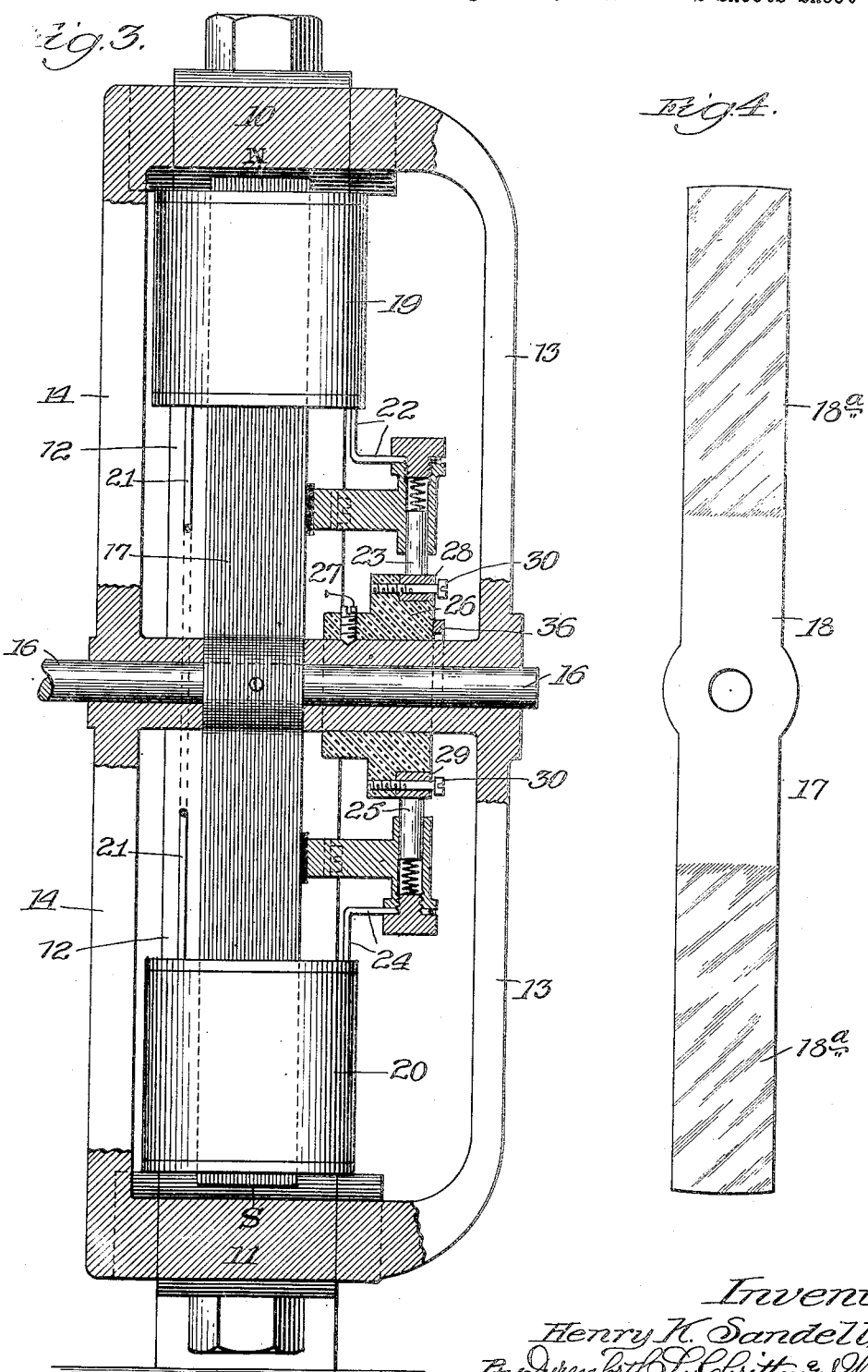

1,578,096

UNITED STATES PATENT OFFICE.

HENRY K. SANDELL, OF CHICAGO, ILLINOIS.

ELECTRIC MOTOR.

Application filed August 22, 1923. Serial No. 658,714.

*To all whom it may concern:*

Be it known that I, HENRY K. SANDELL, a citizen of the United States, residing at Chicago, in the county of Cook and State of Illinois, have invented a new and useful Improvement in Electric Motors, of which the following is a specification.

This invention relates to electric motors and the like and is fully described in the following specification and shown in the accompanying drawing in which:

Figure 1 is an end elevation of a motor embodying the invention;

Fig. 2 is a section on the line 2—2 of Fig. 1, with a revolving member turned to horizontal position;

Fig. 3 is an enlarged section on the line 3—3 of Fig. 1; and

Fig. 4 is a front elevation of one of the laminated sections of the rotating members.

The electric motor as illustrated consists of top and bottom pole pieces 10 and 11 which are secured together at their ends by means of permanent magnets 12, all of which have their north poles pointing in the same direction as shown in Fig. 1. The pole pieces 10 and 11 which are of a suitable magnetic material such as cast iron are connected near their middle by means of brackets 13 and 14 which are secured thereon by means of screws 15.

A shaft 16 is journaled in suitable bearings in the brackets 13 and 14 and has keyed thereto a bar magnet 17 made up of a number of laminated sections 18, one of which is shown in Fig. 4. The centers of these laminations are left soft while the outer ends 18ª are hardened so as to give them momentarily the effect of a permanent magnet.

Electric magnet coils 19 and 20 are secured upon the outer ends of the rotating bar magnet 17, two ends of these coils are connected together by means of a lead 21. The other end of the coil 19 is connected by means of a lead 22 to a brush 23 while the other end of the coil 20 connects by means of a lead 24 with a brush 25. These brushes are carried by the bar magnet 17 and are pressed inwardly by means of springs shown in Fig. 3, so as to be held lightly in contact with the commutator 26 which is secured to the bracket 13 as by means of a screw 27 as shown in Fig. 3.

The block 26 is made of an electric insulating material in which is secured two metallic segments 28 and 29 as by means of screws 30. These segments are connected through leads 31 and 32 with a suitable source of electric energy as the generator 33.

As the shaft 16 revolves in a clockwise direction as indicated in Fig. 1, the brushes 23 and 25 come into contact with the segments 28 and 29 and current flows from the generator 33 and the electric magnet coils 19 and 20 reversing the polarity of the bar magnet 17 so that at the instant shown in Fig. 1, the upper end of the bar magnet becomes a north pole while the lower end is a south pole. It will be observed that the north pole of the rotating magnet is opposite the north pole of the pole piece 10 and likewise the south pole magnet of the pole piece is opposite the south pole piece 11, so that the north pole of the rotating bar magnet will be repelled by the north pole of the fixed pole piece, and the south pole will also be repelled by the pole piece 11 for the same reason, and each end of the rotating bar magnet will be attracted by the opposite pole piece so that the shaft 16 will tend to keep on revolving in the same direction.

The width of the segments 28 and 29 is such as to permit current from the generator 33 time to cause a reversal of magnetism of the tempered outer end of the rotating bar magnet.

Immediately after the brushes 23 and 25 pass the segments 28 and 29 they encounter much longer metal segments 34 and 35 which are electrically connected by means of a lead 36. Collapse of the line of force within the electric magnet coils 19 and 20 due to breaking contact between the segments 28 and 29 and the brushes 23 and 25 tends to cause a continuance of flow of current through the coils in the same direction. The segments 34 and 35 being connected together and coming in contact with the brushes 23 and 25 permit this action to take place for a short period of time, thereby further maintaining the magnetization of the rotating bar magnet near its maximum for a considerable portion of its swing.

As the brushes 23 and 25 are revolved and are brought into contact with the segments 29 and 28 respectively, the direction of flow of current through the coils 19 and 20 is reversed, thereby again reversing the polarity of the bar magnet 17 when the cycle of operation just described is repeated, The commutator is preferably raised at the points having the segments 28 and 29, the initial ends of the segments 34 and 35 being slightly depressed as shown in Fig. 1.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. An electric motor comprising two pole-pieces of opposite polarity, a magnet momentarily having a fixed polarity and rotatable in front of said pole-pieces, and means for changing the polarity of the magnet as it passes the pole-pieces, the magnet being made up of laminated steel sections having soft centers and hardened ends.

2. An electric motor comprising two pole-pieces of opposite polarity, a magnet momentarily having a fixed polarity and rotatable in front of said pole-pieces, and means for changing the polarity of the magnet as it passes the pole-pieces, the magnet being made up of laminated steel sections hardened at their outer ends having soft centers and hardened ends.

3. An electric motor comprising two pole-pieces of opposite polarity, a magnet momentarily having a fixed polarity and rotatable in front of said pole-pieces, electromagnetic coils on the ends of said magnet, and means for reversing the direction of flow of current in said coils as the magnet passes from one pole-piece to the next.

4. An electric motor comprising two pole-pieces of opposite polarity, a magnet momentarily having a fixed polarity and rotatable in front of said pole-pieces, electromagnetic coils on the ends of said magnet, means for reversing the direction of flow of current in said coils as the magnet passes from one pole-piece to the next, and means for short circuiting the ends of said coils to maintain the flow of current in the same direction when contact with the source is broken.

5. An electric motor comprising two pole-pieces of opposite polarity, a magnet momentarily having a fixed polarity and rotatable in front of said pole-pieces, electromagnetic coils on the ends of said magnet, an end of one coil being connected to an end of the other coil, a brush connected to the free end of each coil and rotatable therewith, and a stationary commutator having segments connected to a source of electric current for reversing the polarity of said magnet.

6. An electric motor comprising two pole-pieces of opposite polarity, a magnet momentarily having a fixed polarity and rotatable in front of said pole-pieces, electromagnetic coils on the ends of said magnet, an end of one coil being connected to an end of the other coil, a brush connected to the free end of each coil and rotatable therewith, a stationary commutator having segments connected to a source of electric current for reversing the polarity of said magnet, and intermediate segments connected together to permit current to flow when the brushes quit contact with the first mentioned segments.

7. In an electric motor, an armature, windings thereon, means for energizing said windings as they pass the field poles of the motor, and means for short-circuiting said windings after they have been energized.

8. In an electric motor, an armature having ends of higher retentivity than the center of said armature, windings thereon, means for energizing said windings as they pass the field poles of the motor, and means for short-circuiting said windings after they have been energized.

9. In an electric motor, an armature, windings thereon, a commutator having a pair of segments connected to a source of electric current, a second pair of segments connected to each other, a lead connecting an end of each coil with an end of the other, and brushes connected to the other ends of said coils adapted to bear on said commutator.

HENRY K. SANDELL.